US008618909B1

(12) United States Patent
Clausen

(10) Patent No.: US 8,618,909 B1
(45) Date of Patent: Dec. 31, 2013

(54) APPARATUS TO SEQUENCE AND CONTROL PASSENGER QUEUES

(76) Inventor: Mark Clausen, Milwaukee, WI (US)

( * ) Notice: Subject to any disclaimer, the term of this patent is extended or adjusted under 35 U.S.C. 154(b) by 291 days.

(21) Appl. No.: 13/027,456

(22) Filed: Feb. 15, 2011

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl.
USPC .............................. 340/5.7; 340/5.2; 235/375

(58) Field of Classification Search
USPC ............... 340/4.6, 5.1–5.2, 5.7, 5.8; 235/375; 705/5
See application file for complete search history.

(56) References Cited

U.S. PATENT DOCUMENTS

| | | | | |
|---|---|---|---|---|
| 4,045,997 | A * | 9/1977 | Showalter et al. | 73/23.2 |
| 4,670,844 | A * | 6/1987 | Lach et al. | 701/117 |
| 5,151,692 | A * | 9/1992 | Hirahara | 340/4.6 |
| 6,112,185 | A * | 8/2000 | Walker et al. | 705/5 |
| 6,119,096 | A * | 9/2000 | Mann et al. | 705/5 |
| 6,127,917 | A * | 10/2000 | Tuttle | 340/10.1 |
| 6,137,895 | A * | 10/2000 | Al-Sheikh | 382/115 |
| 6,338,041 | B1 * | 1/2002 | Kawamata | 705/5 |
| 6,507,278 | B1 * | 1/2003 | Brunetti et al. | 340/541 |
| 2002/0022896 | A1 * | 2/2002 | Dugan | 700/83 |
| 2006/0101716 | A1 * | 5/2006 | Vandyck et al. | 49/35 |
| 2006/0117186 | A1 * | 6/2006 | Yeo | 713/182 |
| 2006/0206353 | A1 * | 9/2006 | Buschi et al. | 705/1 |
| 2006/0278764 | A1 | 12/2006 | Zhao | |
| 2007/0046426 | A1 * | 3/2007 | Ishibashi | 340/5.52 |
| 2007/0265890 | A1 * | 11/2007 | Curtis | 705/5 |
| 2008/0195257 | A1 * | 8/2008 | Rauch | 701/1 |
| 2010/0308108 | A1 * | 12/2010 | Choi et al. | 235/382 |

* cited by examiner

*Primary Examiner* — Hai Phan
*Assistant Examiner* — Orlando Bousono

(57) ABSTRACT

This apparatus uses queue control gates with passenger information scanners, zone indicators, and a controller to organize and sequence passengers prior to entry into an aircraft to reduce row and seat interference with other passengers. It allows airlines to decrease the gate time of their aircraft.

5 Claims, 1 Drawing Sheet

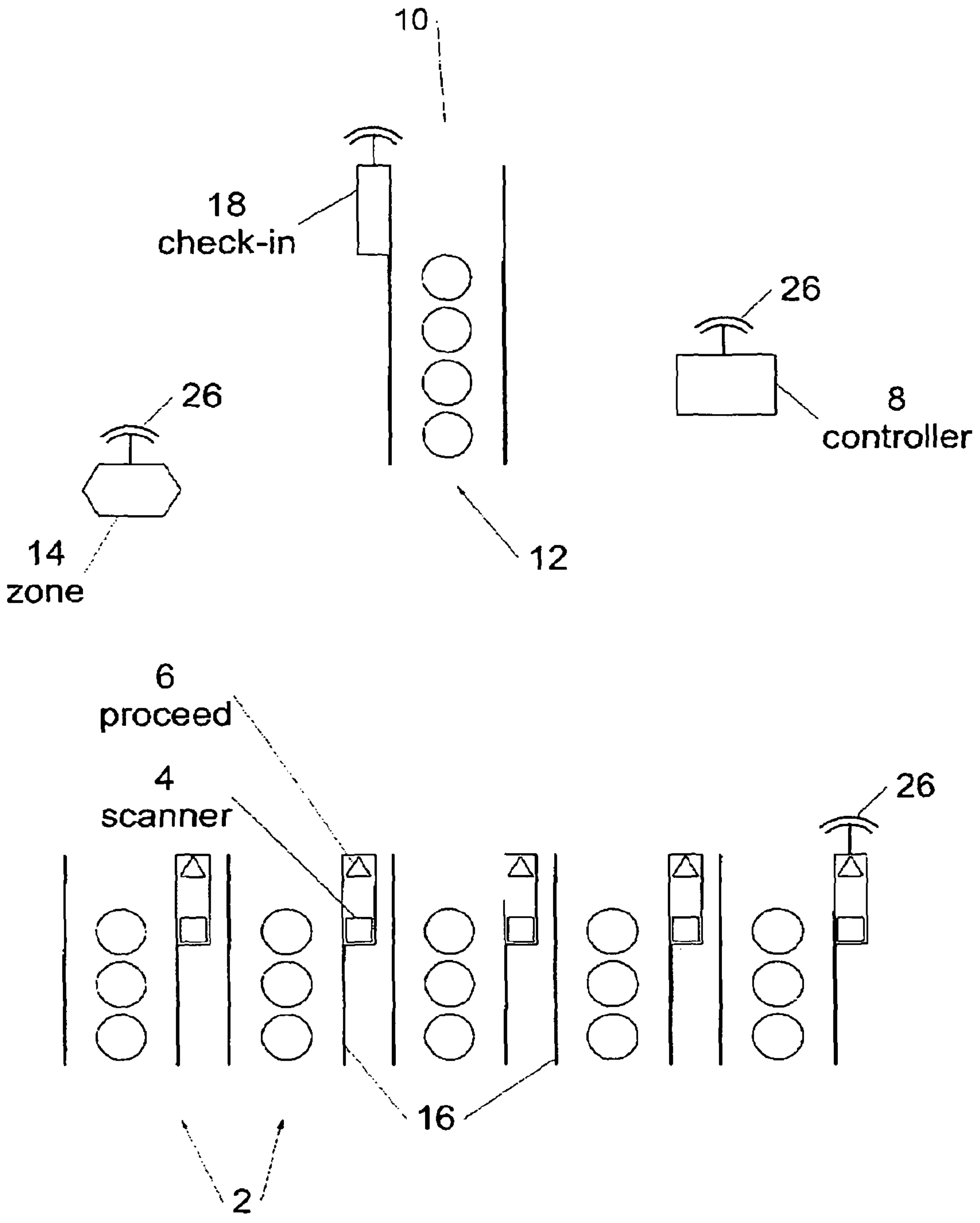
10
18
check-in
26
8
controller
26
14
zone
12
6
proceed
4
scanner
26
16
2

APPARATUS TO SEQUENCE AND CONTROL PASSENGER QUEUES

CROSS-REFERENCE TO RELATED APPLICATIONS

Not Applicable.

FEDERALLY SPONSORED RESEARCH

Not Applicable.

SEQUENCE LISTING OR PROGRAM

Not Applicable.

BACKGROUND OF THE INVENTION

1. Field of Invention

This invention relates to an apparatus that organizes and controls the sequence of passengers entering an aircraft or an airport security checkpoint.

2. Background of the Invention

The quicker an aircraft unloads its passengers and is cleaned, fueled, and reboarded, the less time an aircraft spends on the ground and the more profitable the airline. Further, when an aircraft spends less time at an airline gate, an airline may schedule more flights from that gate, and gate costs per flight decrease.

Passengers find boarding an aircraft time-consuming because they must wait for the passengers in front of them to store their luggage and take their seats. A passenger wastes additional time when he has to climb over other passengers to get to a middle or window seat or when a sitting passenger must move into the aisle to let him in. Airlines have adopted several boarding strategies to decrease these problems, but, according to several studies, none of these strategies has had an appreciable effect. None solves the most important problem—how to reduce interference between passengers as they stow their luggage and take their seats. This invention helps to solve this problem by organizing the boarding passengers before they enter the aircraft. Plus, it does not require additional airline personnel.

3. Prior Art

A number of individuals have developed procedures and inventions to simplify and shorten the boarding process, but none uses boarding queue control gates and a controller to select passengers for optimal boarding.

Júnior, Silva, Briel, and Villalobos ("Aircraft Boarding Fine Tuning", XIV International Conference on Industrial Engineering and Operations Management, October 2008, Rio De Janeiro, Brazil) state that the boarding process is the most time-consuming of the required tasks while the aircraft is on the ground. They state that passenger boarding requires approximately 60% of the total ground time. They found that two impediments slow this process—seat interference (where a seated passenger blocks another passenger's progress to his assigned seat) and aisle interference (where another passenger in the aisle, perhaps stowing his luggage, blocks a passenger's way to his assigned seat).

Steiner and Philipp ($9^{th}$ Swiss Transport Research Conference, September 2009, Monte Veritá/Ascona, Switzerland) calculate that SWISS International Airlines could save 640,000 Swiss francs (approximately $546,000) per year by reducing aircraft gate time by 5 minutes per flight on 5 flights per day at a single gate in Zurich.

To decrease boarding times at airline gates, some individuals have developed various boarding inventions and techniques. Buschi, Coulomb, Gibault, and Palaysi (US 2006/0206353, 14 Sep. 2006) designed a virtual destination locator to speed boarding passengers to their seats. To speed up the boarding process, Yun Zhao (US 2006/0278764 A1, 14 Dec. 2006) proposed zone boarding by seat location—boarding passengers in window seats first, middle seats next, and aisle seats last.

4. Objects and Advantages

This apparatus consists of a number of queue control gates communicating with a controller. A queue control gate consists of a passenger information scanner and a proceed indicator. The controller monitors and controls the queue control gates and may interface with airline computers and external databases.

Located in the boarding area at the airline gate, the airline arranges the queue control gates so that passengers must pass through them before reaching the boarding gate. The queue control gates select passengers for boarding in a sequence that minimizes boarding difficulties.

Passengers queue up behind the queue control gates, and the controller selects the passengers for boarding based on their passenger information (e.g. seat assignment). The airline may program the controller for various types of aircraft and for any number of different boarding strategies. When selected, a passenger leaves the queue control gate, moves through the boarding gate and into the aircraft. This apparatus ensures that at least the number of passengers equal to the number waiting at the queue control gates do not interfere with each other during the seating process. In this way, the controller arranges the passengers in a sequence that minimizes boarding time.

DRAWINGS

Figures

FIG. 1 shows a schematic view of a controller with an arrangement of five queue control gates and a boarding gate.

REFERENCE NUMERALS

2—queue control gate
4—passenger information scanner
6—proceed indicator
8—controller
10—boarding gate
12—buffer aisle
14—zone indicator
16—aisle marker
18—check-in station
22—aisle
26—communications equipment

DETAILED DESCRIPTION

FIG. 1 shows one arrangement of queue control gates 2 in conjunction with a boarding gate 10. Although not shown, an airline would likely cordon off the queue control gates 2 to ensure that passengers pass through one of the queue control gates 2 before reaching the boarding gate 10. Each queue control gate 2 contains a passenger information scanner 4 linked to a proceed indicator 6 in the form of a green light or some similar indicator. The proceed indicator 6 may or may not be physically co-located with the passenger information scanner 4. A controller 8 receives the passengers' information obtained by scanners 4 at queue control gates 2 transmitted via communications equipment 26. When controller 8 has access to a passenger database, passenger information read by scanner 4 may be supplemented with passenger information not available from the information scanner 4 (such as age, physical disabilities, etc). Once a group of passengers reaches the queue control gates 2, the controller 8 uses an algorithm to control the passenger boarding sequence by selecting the next passenger to board and activating the proceed indicator 6 for that passenger. After a short delay to allow the passenger time to move toward the boarding gate 10, the controller 8 repeats this process at the same or other queue control gates 2. Because of airline procedures or federal regulations, it may be necessary to have a check-in station 18 in addition to the queue control gates 2.

During the boarding process, the most important passenger information is likely his seat assignment; however, other information might also be useful when forming the queue entering boarding gate 10, e.g. seat class information or passenger disabilities.

FIG. 1 shows a check-in station 18 and buffer aisle 12 located between the queue gates 2 and the boarding gate 10. Buffer aisle 12 ensures that the check-in station 18 is always busy. In addition, FIG. 1 depicts a zone indicator 14, which may be controlled by airline personnel or by controller 8, to organize passengers waiting at the queue control gates 2. The zone indicator 14 controls the boarding queue by selecting passengers waiting to access the queue control gates 2. (For example, the zone indicator could restrict the queues to passengers with window seats.) In this manner, a zone indicator 14 reduces seat interference, while queue control gates 2 (using seat assignment information) reduce row interference.

Although shown as a separate entity in FIGS. 1 and 2, controller 8 could take the form of a software module in a computer that performs other functions. Controller 8 could access passenger and airline information through a database server or some other similar computer network mechanism. Communications to external equipment (such as queue control gates 2, aisle indicators 20, and zone indicators 14) occurs through communication equipment 26.

Operation:

Controller 8 sequences the boarding queue by selecting the next passenger to board from the set of passengers currently waiting at the queue control gates 2. Each time a new passenger scans-in at a queue control gate 2, he becomes part of the set and may be selected to proceed before passengers already waiting at other queue control gates 2.

By communicating with the airline's other computer systems, the controller 8 is aware of each aircraft's seating pattern. If such communication is not possible, the airline may enter the aircraft seating information into the controller 8 by other means.

If an aircraft has multiple boarding doors, the airline may add another set of control gates 2 for each door.

Similarly, if an aircraft has multiple aisles, the airline may add an additional set of control gates 2 for each aisle. Even if all passengers from all control gates 2 enter through the same boarding gate 10, they will divide after getting into the aircraft so that the queue sequence will be maintained for each aisle.

The queue control gates 2 do not require any particular boarding strategy and, when used with a zone indicator 14, provide an airline with numerous boarding possibilities. The zone indicator 14 informs passengers as to which of them should queue at control gates 2. Depending upon the airline boarding strategy, the zone indicator 14 may first call passengers with seats located in the rear of the aircraft, or by seat location (window, middle, aisle), or use any other boarding strategy.

Intuitively, it seems best to use "seat letter" zone boarding, where all the "A" (window) seats fill back to front, followed by "B" (center) seats back to front, etc. Using this strategy, the zone indicator 14 would call all the "A" seat passengers to the queue control gates 2. The controller 8 would then admit "A" seat passengers into the aircraft and use seat assignment information to admit those with higher row numbers first. If five control gates 2 are used (see FIG. 1), then at least these five passengers will not interfere with each other as they board. After the "A" seat passengers board, the zone indicator 14 would call up the passengers with other seat letters.

CONCLUSION, RAMIFICATIONS, AND SCOPE

Boarding an aircraft or other similar vehicles is often time-consuming because passengers must wait for those in front of them to store their luggage and take their seats. In an attempt to ameliorate this problem, airlines have adapted several boarding strategies—back-to-front aircraft boarding, window-to-isle boarding sequences, etc. However, none of these methods solves the problem of reducing passenger seat and row interference. This apparatus helps to solve this problem.

I claim:

1. An apparatus for controlling a passenger boarding sequence through a boarding gate comprising:

a) a plurality of queue control gates for controlling a set of passengers waiting at said plurality of queue control gates where each queue control gate of said plurality of queue control gates further comprises:

(1) a passenger information scanner:

(2) a proceed indicator which directs a passenger waiting at said queue control gate to proceed to said boarding gate, b) a controller in communication with each said queue control gate for controlling said set of passengers where said set of passengers is determined by which passengers have elected to enter said plurality of queue control gates and have their passenger information scanned by said passenger information scanner and where said controller is programmed with an algorithm that uses said passenger information communicated from said passenger information scanners to determine seat assignment information and where said algorithm uses said seat assignment information and said passenger information to control said proceed indicators and by so doing controls which passenger of said set of passengers waiting in a leading position at each of said plurality of queue control gates will proceed to said boarding gate.

2. The apparatus of claim 1 where said algorithm sequences said passengers by allowing one of said passengers of said set of passengers with a generally more all seat assignment waiting at said plurality of queue control gates to proceed first, thereby reducing row interference.

3. The apparatus of claim 1 wherein said apparatus further comprises a zone indicator in communication with said controller and controlled by said algorithm where said zone indicator specifies zones by seat position relative to an aircraft aisle and where said algorithm uses said zone indicator to limit which passengers can elect to enter said queue control gates to one of said zones to reduce seat interference whereby said zone indicator is used to reduce seat interference and said queue control gates to reduce row interference.

4. The apparatus of claim 1, where a most recently boarded passenger is the passenger who is the most recent passenger to proceed from any one of said queue control gates to said boarding gate and where a most-aft passenger has a most-aft seat assignment of said set of passengers and where said algorithm sequences passengers of said set of passengers such that the first said passenger allowed through one of said queue control gates is said most-aft passenger and all subsequent passengers are sequenced so that each has the most-aft seat assignment that is forward of said most recently boarded passenger until there are no more passengers with seat assignments forward of said most recently boarded passenger in which case said algorithm will again allow said most-aft passenger to board whereby passengers with seat assignments at many different rows along the length of the cabin will be boarding without interference.

5. The apparatus of claim 4 wherein said apparatus further comprises a zone indicator in communication with said controller and controlled by said algorithm where said zone indicator specifies zones by seat position relative to an aircraft aisle and where said algorithm uses said zone indicator to limit which passengers can elect to enter said queue control gates to one of said zones to reduce seat interference whereby said zone indicator is used to reduce seat interference and said queue control gates to reduce row interference.

* * * * *